United States Patent
Can et al.

(10) Patent No.: US 8,007,552 B2
(45) Date of Patent: Aug. 30, 2011

(54) CUBIC BORON NITRIDE COMPACT

(75) Inventors: Nedret Can, Boksburg (ZA); Stig Ake Andersin, Robertsfors (SE)

(73) Assignee: Element Six (Production) (Pty) Ltd, Springs (ZA)

( * ) Notice: Subject to any disclaimer, the term of this patent is extended or adjusted under 35 U.S.C. 154(b) by 755 days.

(21) Appl. No.: 11/718,249

(22) PCT Filed: Oct. 28, 2005

(86) PCT No.: PCT/IB2005/003221
§ 371 (c)(1),
(2), (4) Date: Jan. 29, 2008

(87) PCT Pub. No.: WO2006/046125
PCT Pub. Date: May 4, 2006

(65) Prior Publication Data
US 2009/0056232 A1    Mar. 5, 2009

(30) Foreign Application Priority Data

Oct. 29, 2004  (IE) .................................. S2004/0721
Oct. 29, 2004  (IE) .................................. S2004/0722

(51) Int. Cl.
*B24D 3/02*  (2006.01)
(52) U.S. Cl. ......................................................... 51/307
(58) Field of Classification Search .................... None
See application file for complete search history.

(56) References Cited

U.S. PATENT DOCUMENTS

| 4,343,651 | A | 8/1982 | Yazu et al. |
| 6,383,465 | B1 * | 5/2002 | Matsumoto et al. .......... 423/290 |
| 2003/0054940 | A1 | 3/2003 | Abe et al. |
| 2004/0002418 | A1 * | 1/2004 | Scurlock et al. ............. 501/96.4 |

FOREIGN PATENT DOCUMENTS

| EP | 0 879 806 | 11/1998 |
| JP | 60145351 | * 7/1985 |
| JP | 63 145726 | 6/1988 |

OTHER PUBLICATIONS

Cao, Ze-xian, et al. "Electron-Spectroscopy Study of Amorphous CN:Ti Films". 928, vol. 16, No. 12 (1999).*
Rong, et al., "High-pressure Sintering of cBN-TiN-Al Composite for Cutting Tool Application", Diamond and Related Materials, Elsevier, vol. 11, No. 2, pp. 280-286, 2002.
U.S. Appl. No. 11/718,119, filed Apr. 27, 2007, Can, et al.
U.S. Appl. No. 11/718,281, filed Apr. 30, 2007, Can, et al.

* cited by examiner

*Primary Examiner* — Melvin C Mayes
*Assistant Examiner* — Sheng H Davis
(74) *Attorney, Agent, or Firm* — Oblon, Spivak, McClelland, Maier & Neustadt, L.L.P.

(57) ABSTRACT

A CBN compact comprises CBN and a matrix phase incorporating a secondary hard phase selected from TiCN, TiC, TiN and mixtures and solid solutions thereof and a maximum amount of titanium diboride where the XRD peak height of the (101) titanium diboride peak (after background correction) is less than 12% of the peak height of the (111) CBN peak.

18 Claims, 12 Drawing Sheets

CUBIC BORON NITRIDE COMPACT

CROSS-REFERENCE TO RELATED APPLICATIONS

This application is a 371 of PCT/IB05/03221 filed Oct. 28, 2005 and claims the benefit of Ireland S2004/0721 filed Oct. 29, 2004 and Ireland S2004/0722 filed Oct. 29, 2004.

BACKGROUND OF THE INVENTION

This invention relates to cubic boron nitride (CBN) abrasive compacts.

Boron nitride exists typically in three crystalline forms, namely cubic boron nitride (CBN), hexagonal boron nitride (hBN) and wurtzitic cubic boron nitride (wBN). Cubic boron nitride is a hard zinc blend form of boron nitride that has a similar structure to that of diamond. In the CBN structure, the bonds that form between the atoms are strong, mainly covalent tetrahedral bonds.

CBN compacts comprise sintered masses of CBN particles. When the CBN content exceeds 80 percent by volume of the compact, there is a considerable amount of CBN-to-CBN contact. When the CBN content is lower, e.g. in the region of 40 to 60 percent by volume of the compact, then the extent of direct CBN-to-CBN contact is limited.

CBN compacts will generally also contain a binder phase such as aluminium, silicon, cobalt, nickel, and titanium.

When the CBN content of the compact is less than 70 percent by volume the matrix phase, i.e. the non-CBN phase, will generally also comprise another hard phase, a secondary phase, which may be ceramic in nature. Examples of suitable ceramic hard phases are carbides, nitrides, borides and carbonitrides of a Group 4, 5 or 6 (according to the new IUPAC format) transition metal, aluminium oxide, and carbides such as tungsten carbide and mixtures thereof. The matrix phase constitutes all the ingredients in the composition excluding CBN.

CBN compacts may be bonded directly to a tool body in the formation of a tool insert or tool. However, for many applications it is preferable that the compact is bonded to a substrate/support material, forming a supported compact structure, and then the supported compact structure is bonded to a tool body. The substrate/support material is typically a cemented metal carbide that is bonded together with a binder such as cobalt, nickel, iron or a mixture or alloy thereof. The metal carbide particles may comprise tungsten, titanium or tantalum carbide particles or a mixture thereof.

A known method for manufacturing the CBN compacts and supported compact structures involves subjecting an unsintered mass of CBN particles together with powdered matrix phase, to high temperature and high pressure conditions, i.e. conditions at which the CBN is crystallographically stable, for a suitable time period. Typical conditions of high temperature and pressure which are used are temperatures in the region of 1100° C. or higher and pressures of the order of 2 GPa or higher. The time period for maintaining these conditions is typically about 3 to 120 minutes.

CBN has wide commercial application in machining tools and the like. It may be used as an abrasive particle in grinding wheels, cutting tools and the like or bonded to a tool body to form a tool insert using conventional electroplating techniques. CBN may also be used on bonded form as a CBN compact. CBN compacts tend to have good abrasive wear, are thermally stable, have a high thermal conductivity, good impact resistance and have a low coefficient of friction when in contact with a workpiece. The CBN compact, with or without substrate, is often cut into the desired size and/or shape of the particular cutting or drilling tool to be used and then mounted on to a tool body utilising brazing techniques.

CBN compacts are employed widely in the manufacture of cutting tools for finish machining of hardened steels, such as case hardened steels, ball-bearing steels and through hardened engineering steels. In addition to the conditions of use, such as cutting speed, feed and depth of cut, the performance of the CBN tool is generally known to be dependent on the geometry of the workpiece and in particular, whether the tool is constantly engaged in the workpiece for prolonged periods of time, known in the field as "continuous cutting", or whether the tool engages the workpiece in an intermittent manner, generally known in the field as "interrupted cutting".

Depending on the workplece geometry, it is common for the CBN tool to experience both continuous and interrupted cutting within a process cycle and furthermore, the ratio of continuous to interrupted cutting varies widely in the field. After extensive research in this field it was discovered that these different modes of cutting place very different demands on the CBN material comprising the cutting edge of the tool. The main problem is that the tools tend to fail catastrophically by fracturing or chipping, exacerbated by an increasing demand in the market for higher productivity through increased cutting speeds. This typically results in a reduced life of the tool which necessitates regular replacement of the tool. This in turn, typically results in an increase in production costs, which is disadvantageous. It is desirable to develop improved CBN-based materials that function more efficiently e.g. that exhibit improved failure resistance and wear strength.

U.S. Pat. No. 6,316,094 discloses a CBN sintered body in which CBN particles of a single average particle size are bonded through a bonding phase. A powdered composition is sintered to produce the sintered body. This powdered composition is made using various mixing methods such as ultrasonic mixing and attrition milling. In U.S. Pat. No. 6,316,094, attrition milling is claimed to be the poorest mixing method.

U.S. Pat. No. 4,334,928 discloses a boron nitride sintered compact comprising CBN particles and various titanium containing compounds. The titanium containing compounds are typically pre-reacted and formed into a sintered compact which is then crushed. The CBN compact further contains CBN having a single average particle size. Relatively low temperatures are used in the sintering process to produce the CBN compact.

SUMMARY OF THE INVENTION

According to the present invention, a CBN compact comprises CBN and a matrix phase incorporating a secondary hard phase selected from TiCN, TiC, TiN and mixtures and solid solutions thereof and a maximum amount of titanium diboride where the XRD peak height of the (101) titanium diboride peak (after background correction) is less than 12% of the peak height of the (111) CBN peak, preferably less than 10% of the CBN peak height and more preferably less than 5% of the CBN peak height.

Further according to the invention a peak, as measured in XRD analysis, for the titanium-based secondary hard phase has a Full-Width-Half-Maximum (FWHM) value of at least 0.2 degrees 2 theta, preferably at least 0.25 degrees 2 theta, more preferably at least 0.3 degrees 2 theta.

The CBN compact typically contains 35 to 75 volume %, preferably 35 to 65 volume %, of the CBN.

The matrix phase may further comprise a binder phase. The binder phase may be aluminium. It will be appreciated that aluminium may exist as aluminium or as bonded forms of aluminium, such as aluminium nitride, aluminium diboride, titanium aluminide and/or combinations thereof. The matrix phase may further comprise tungsten carbide and/or $Al_2O_3$.

According to a further aspect of the invention, there is provided a tool insert containing a CBN compact as defined above.

DETAILED DESCRIPTION OF PREFERRED EMBODIMENTS

Figure 1:
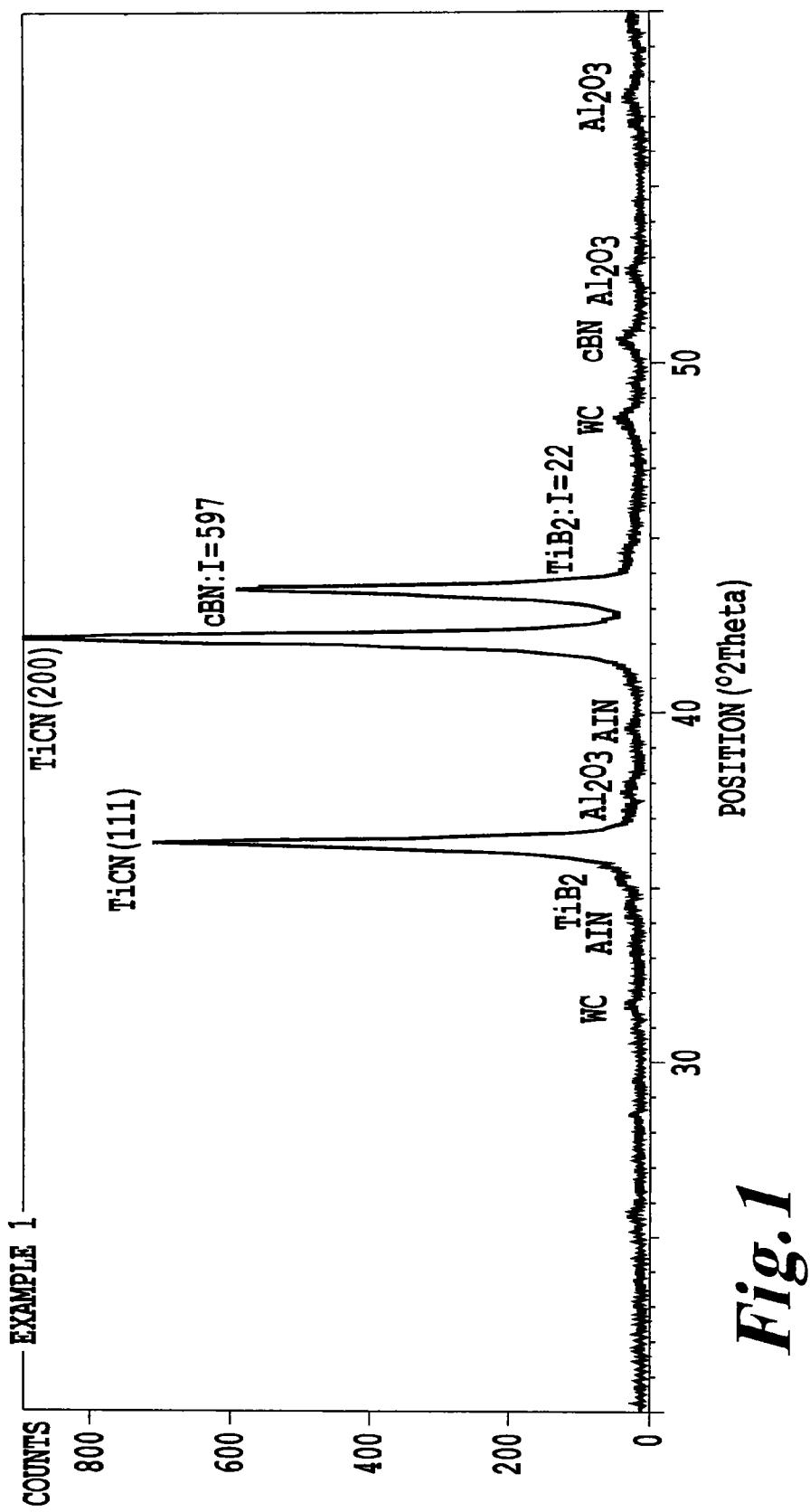
FIG. 1. XRD Trace of Example 1 material, before background correction
Figure 2:
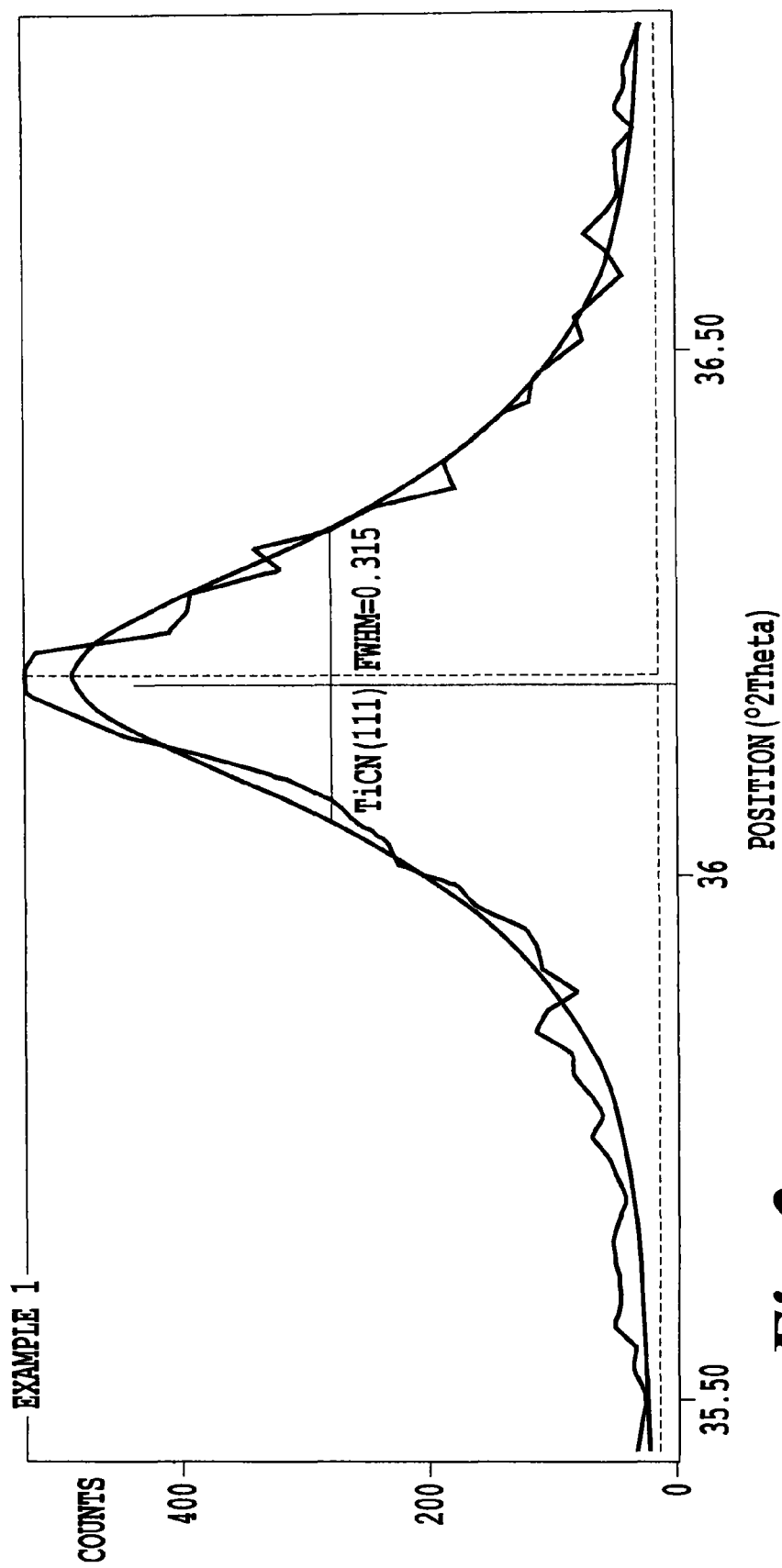
FIG. 2 shows the FWHM measurement of TiCN (111) phase of Example 1 material.
Figure 3:
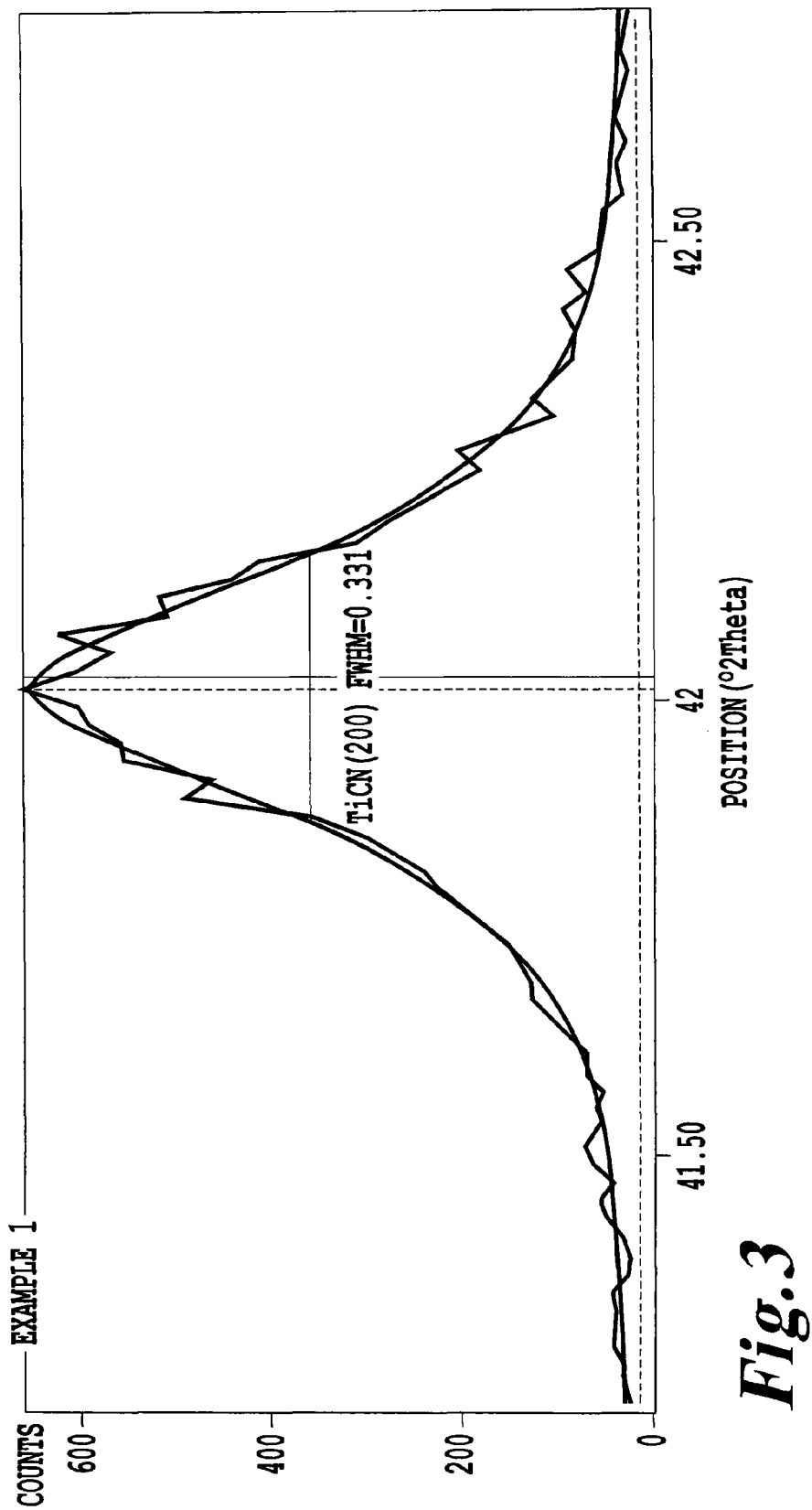
FIG. 3 shows FWHM measurement of TiCN (200) phase of Example 1 material.
Figure 4:
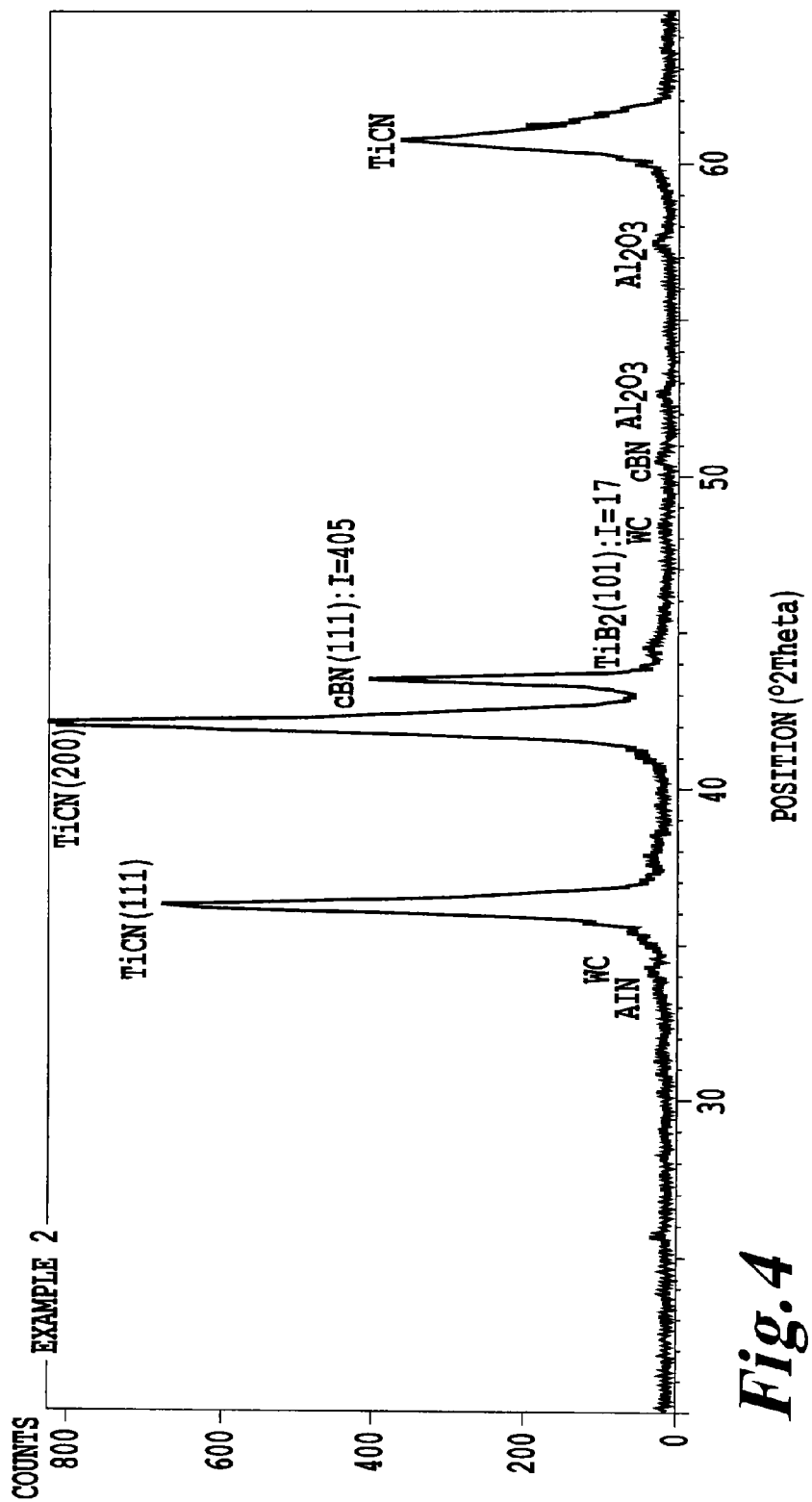
FIG. 4. XRD Trace of Example 2 material, before background correction
Figure 5:
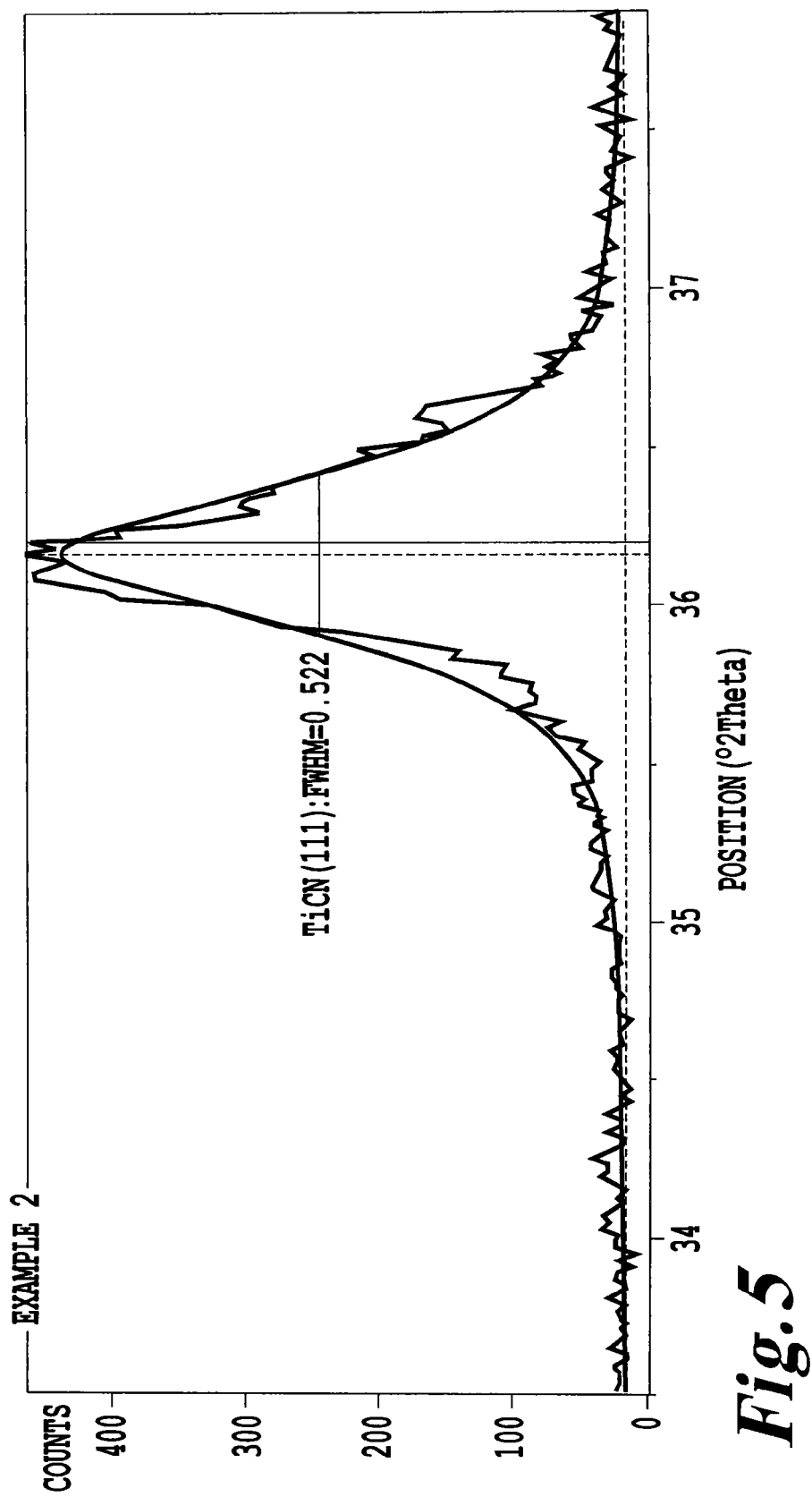
FIG. 5 shows the FWHM measurement of TiCN (111) phase of Example 2 material.
Figure 6:
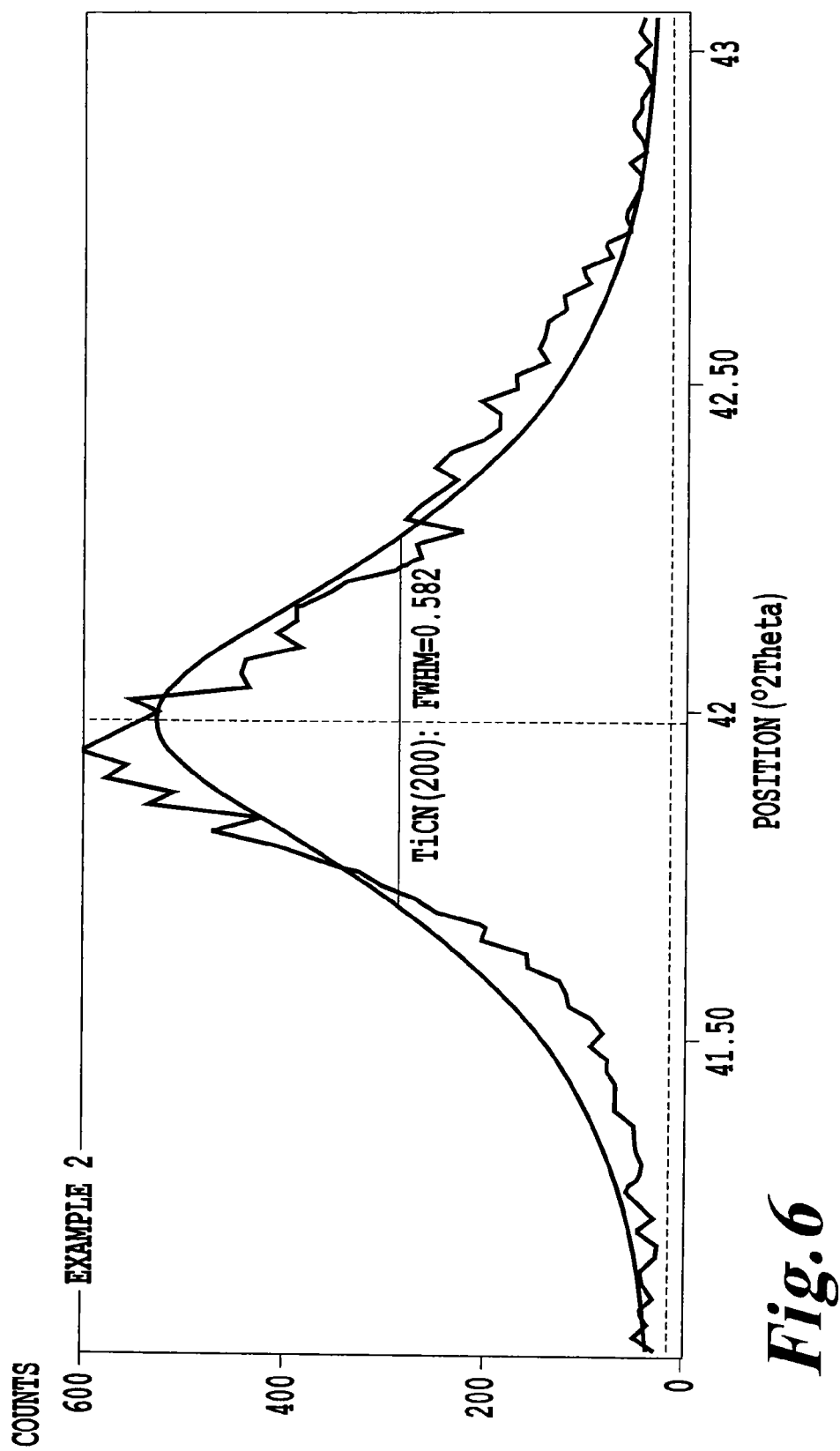
FIG. 6 shows FWHM measurement of TiCN (200) phase of Example 2 material.
Figure 7:
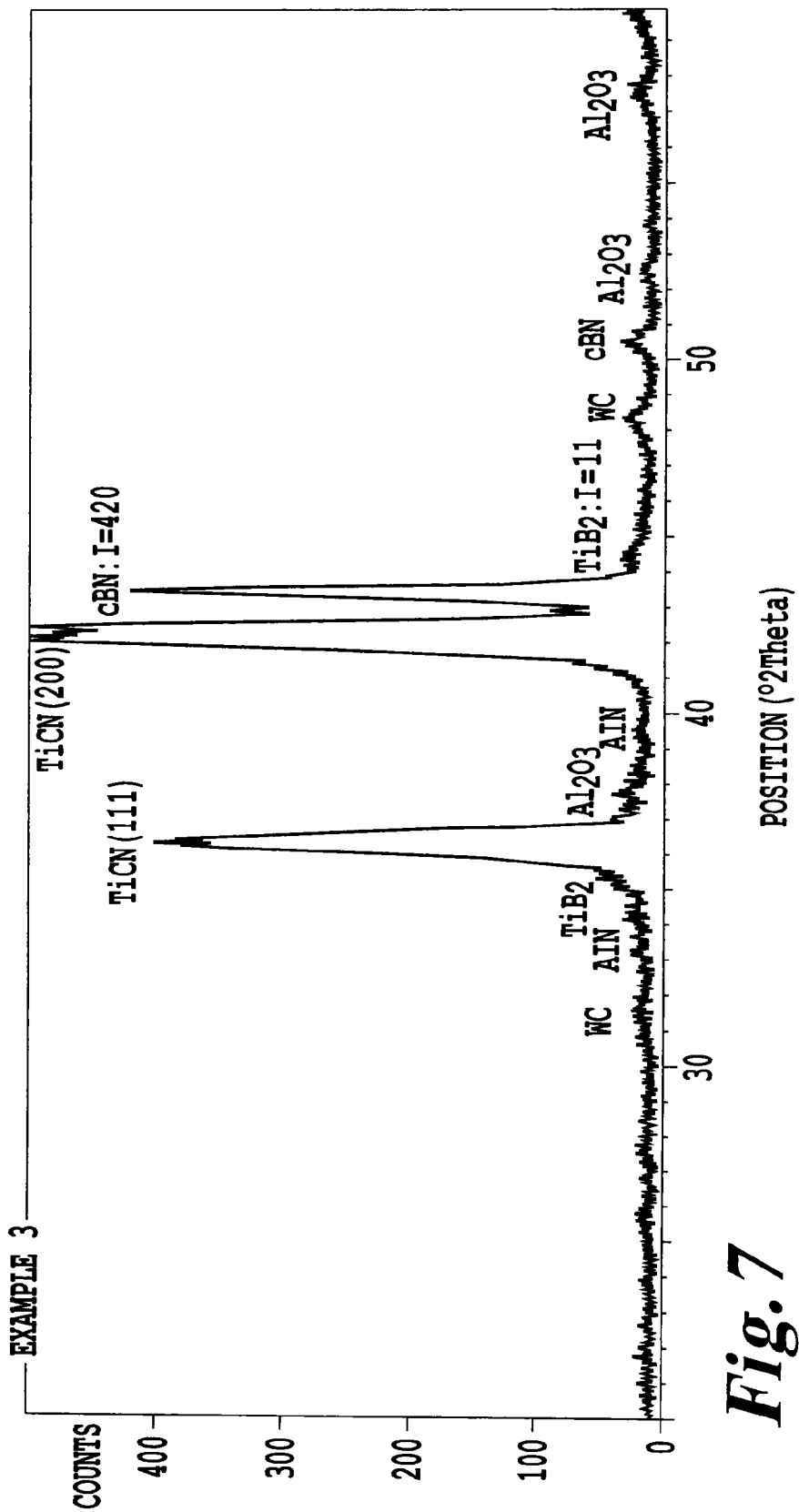
FIG. 7. XRD Trace of Example 3 material, before background correction.
Figure 8:
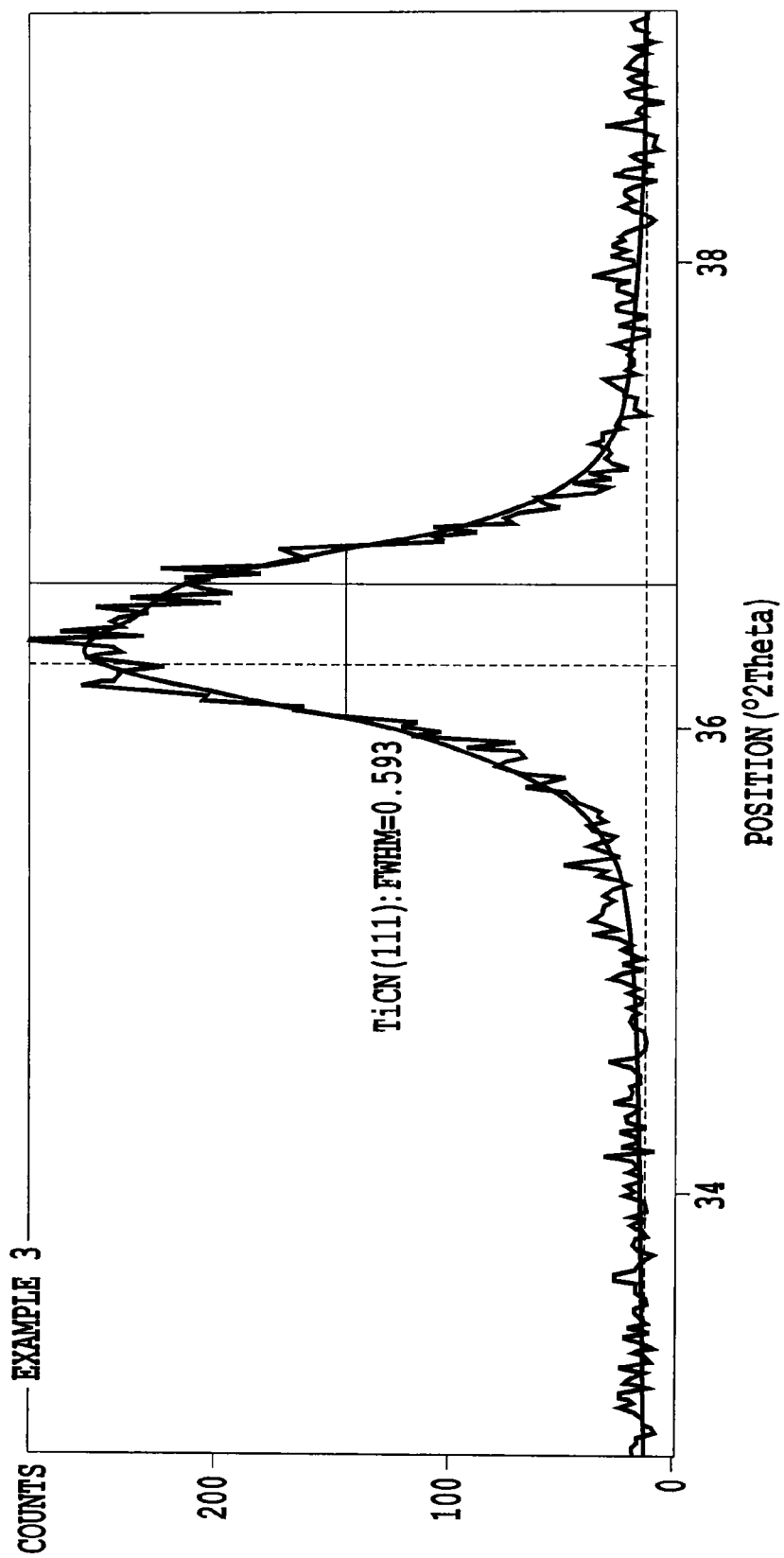
FIG. 8 shows the FWHM measurement of TiCN (111) phase of Example 3 material.
Figure 9:
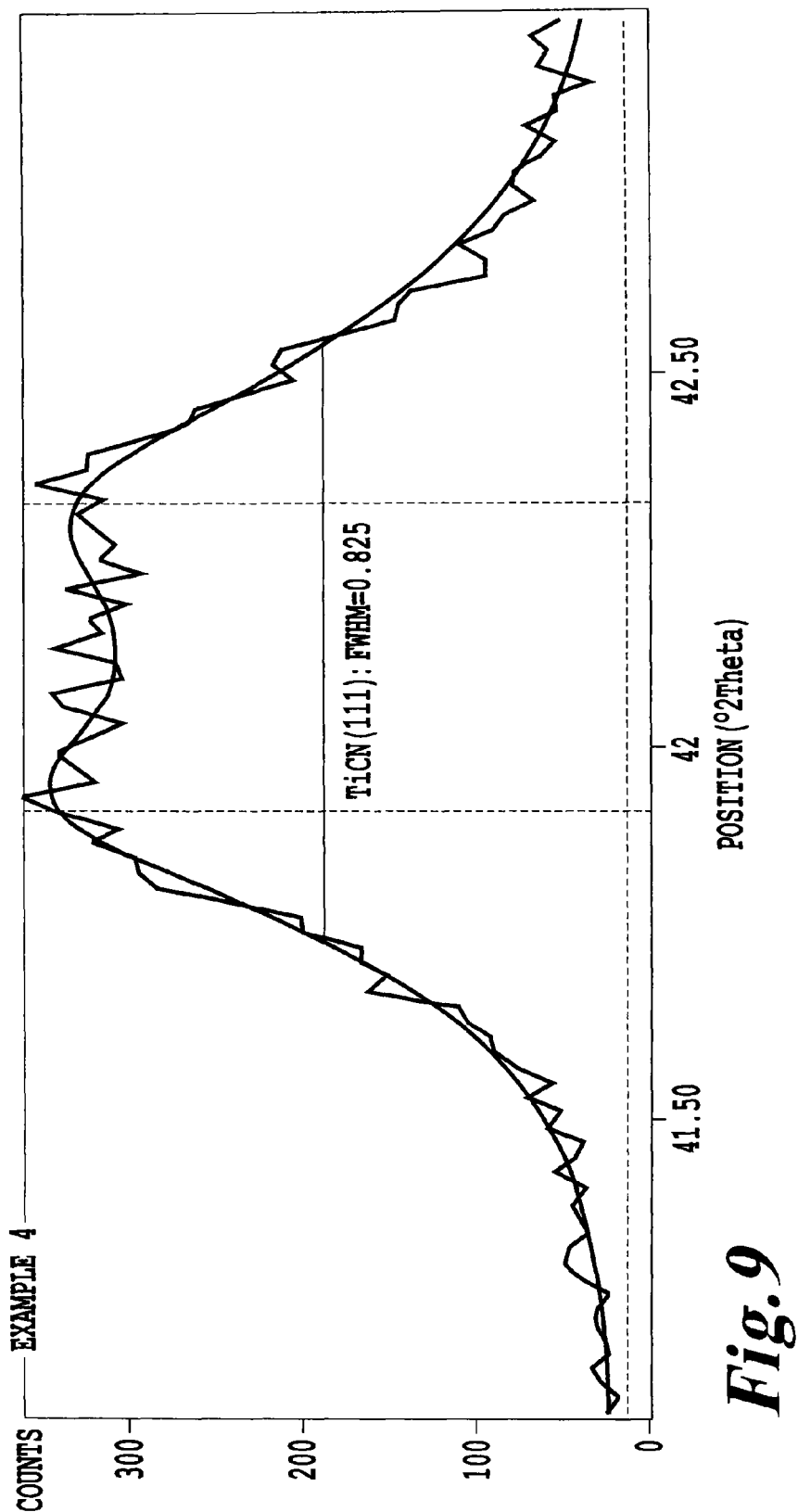
FIG. 9 shows FWHM measurement of TiCN (200) phase of Example 3 material.
Figure 10:
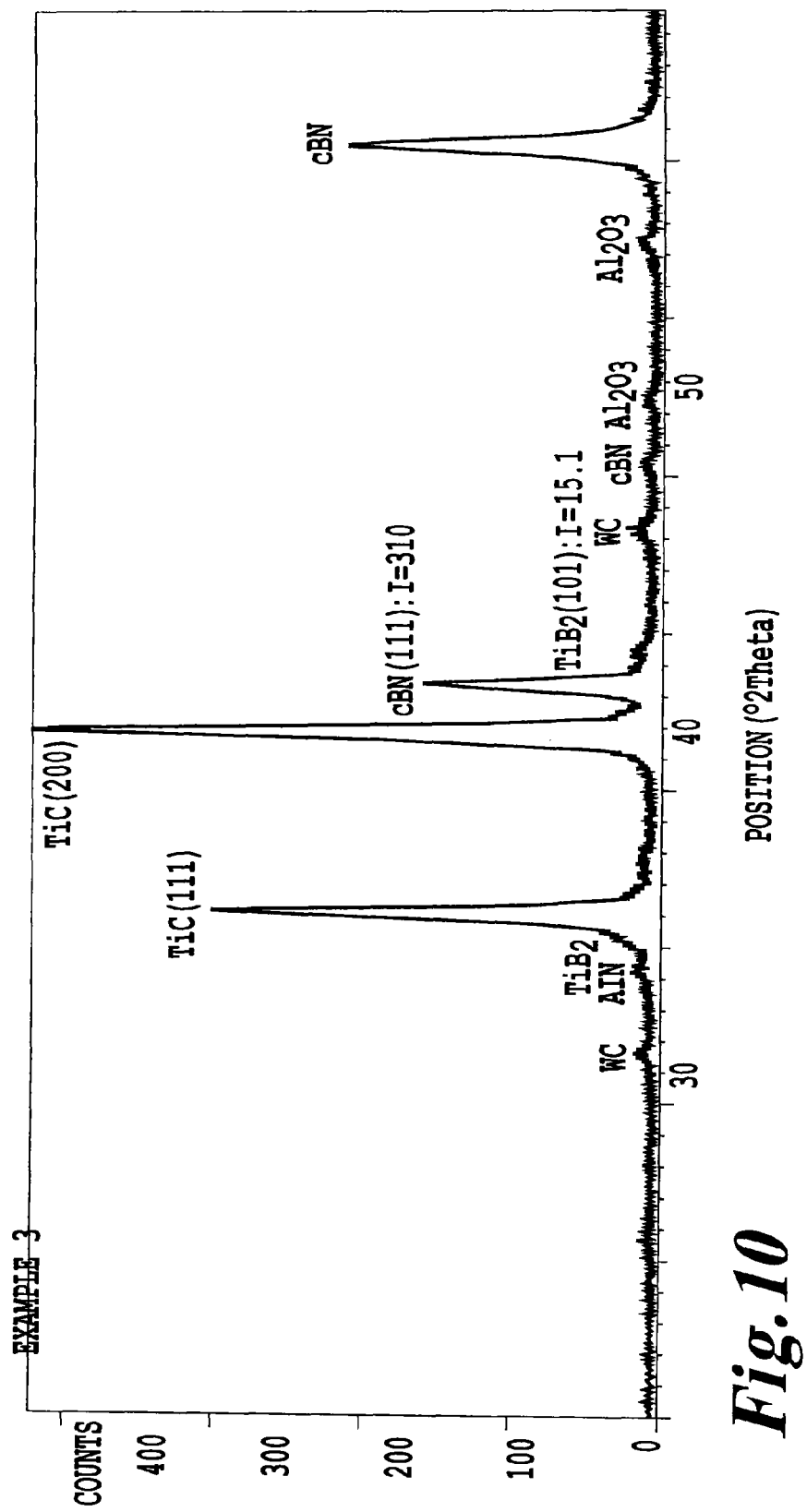
FIG. 10. XRD Trace of Example 4 material, before background correction.
Figure 11:
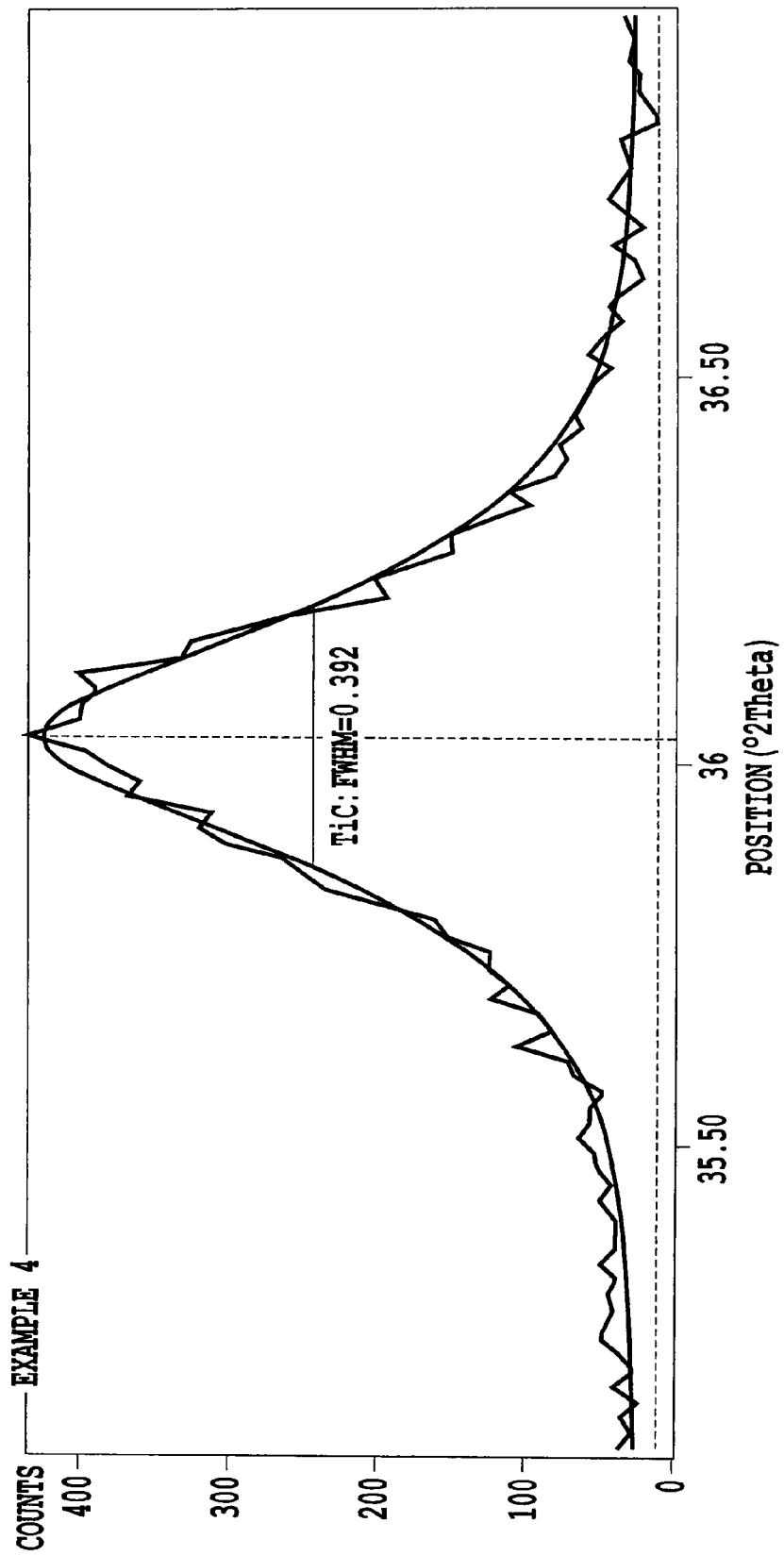
FIG. 11 shows the FWHM measurement of TiC (111) phase of Example 4 material.
Figure 12:
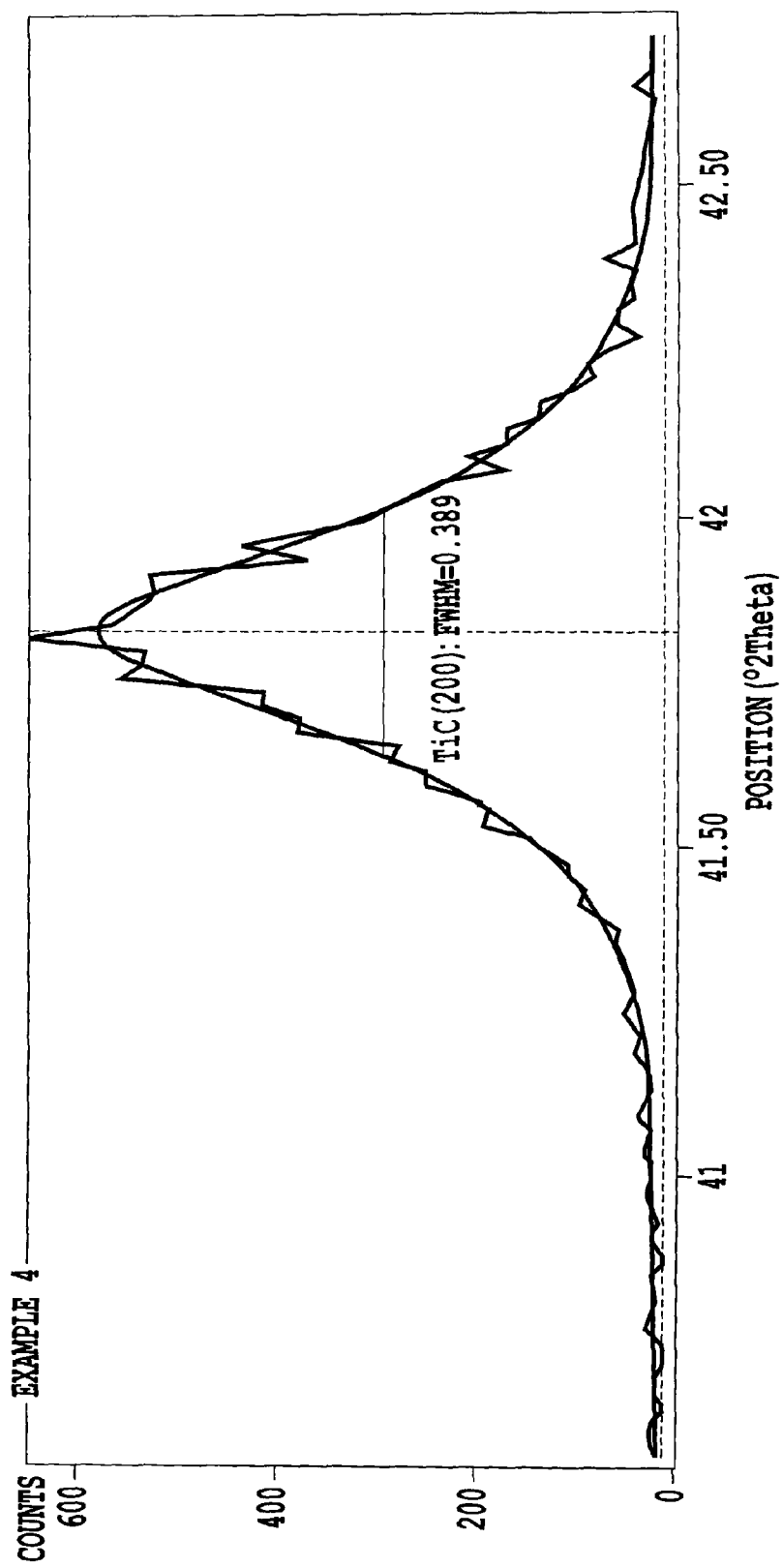
FIG. 12 shows FWHM measurement of TiC (200) phase of Example 4 material.

The present invention relates to CBN compacts, more specifically, to a CBN compact comprising CBN and a matrix phase incorporating a titanium-based secondary hard phase and a very low amount of titanium diboride, as defined above.

Titanium diboride is typically present in the CBN compact as a result of the reaction between CBN and the secondary hard phase which contains titanium compounds such as titanium carbonitride. The $TiB_2$ typically acts as a bonding agent between the CBN grains and the secondary hard phase grains. However, if there is too high an amount of titanium diboride in the CBN material, the abrasion resistance of the material will typically increase; whereas the fracture and chipping resistance will decrease. The increase in abrasion resistance of a CBN material with high $TiB_2$ content is possibly due to high hardness of $TiB_2$. The decrease in fracture and chipping resistance is possibly related to the anisotropy of material thermal expansion coefficient. Since $TiB_2$ has a hexagonal crystal structure, (CBN, AlN, titanium carbonitride all have cubic crystal structure), $TiB_2$ introduces residual stress between the CBN and the secondary hard phase material due to the anisotropy of the thermal expansion coefficient. This leads to a weakening of the interface between the CBN and the secondary hard phase, resulting in a loss of strength and hence a substantial performance loss in applications where fracture and chipping resistance are required.

The present invention is the first to recognise the problem and solves it by reducing the $TiB_2$ content between CBN and secondary hard phase grains to a level where the performance of the material can be optimised. These optimal levels of $TiB_2$ in the CBN compact have been quantified using the X-Ray diffraction peak height ratios of $TiB_2$ to the measured peak height of the CBN in the material.

Another aspect of this invention is that the CBN material contains secondary hard phase which exhibits high XRD peak broadening. The XRD peak broadening of the secondary hard phase (at low diffraction angles) indicates that this phase has a very fine grain size and also contains variation in chemistry. These unique aspects improve the material properties and thus provide enhanced performance in applications where high cutting edge chipping and fracture resistance is required. The character of secondary hard phase were defined by using the Full-Width-Half-Maximum (FWHM) measurements of the XRD peaks of the secondary hard phase material.

X-ray examination of the CBN compact materials was carried out using a vertical diffractometer fitted with Cu radiation with generator settings of 40 kV and 45 mA. Typically XRD scans were carried out between 20 to 65 degrees 2 theta range, with a step size of 0.02 degrees 2 theta, with 5 seconds per step. Collected XRD scans were background-corrected and Ka-2 striped before FWHM measurements. FWHM measurements were done after curve-fitting the data and determining peak position. FWHM measurements were done on the titanium carbonitride, titanium nitride and titanium carbide peaks with (111) and (200) planes. Peak heights were measured directly after identifying the peak position. CBN peak height was measured on the (111) plane; whereas $TiB_2$ height was measured on (101) plane.

The CBN compact of the invention is made by making a mixture of the CBN particles and the matrix phase, in powdered form. The CBN particles in this mixture may be unimodal, i.e. all of the CBN particles have a similar average particle size or multimodal, i.e. the CBN particles are made up of a mixture of particles of at least two average particle sizes. When the CBN is multimodal, the CBN is preferably bimodal, i.e. the CBN consists of particles with two average particle sizes.

The matrix phase may further comprise a binder phase, such as but not limited to aluminium. It will be appreciated that aluminium may exist as aluminium or as bonded forms of aluminium, such as aluminium nitride, aluminium diboride, titanium aluminide and combinations thereof.

Where titanium carbonitride is the secondary hard phase, it may be substoichiometric i.e. $Ti(C_{1-x}N_x)_y$, where x shows the solid solution concentration of the nitrogen with respect to the carbon; and y shows the ratio of the total carbonitride species with respect to the titanium. Typically prior to sintering the TiCN may be pre-reacted with the binder phase e.g. aluminium when present. This will lead to a reaction product of stoichiometric titanium carbonitride, titanium aluminide and any unreacted phases.

It has been found that one way of achieving a fine particle size of the secondary hard phase is to use attrition milling in producing the mixture of CBN and matrix phase. Attrition mills consist of an enclosed grinding chamber with an agitator that rotates at high speeds in either a vertical or horizontal configuration. Milling media used are typically in the size range 0.2 to 15 mm and, where comminution is the objective, milling media typically are cemented carbides, with high density. The high rotational speeds of the agitator, coupled with high density, small diameter media, provide for extremely high energy. Furthermore, the high energy in attrition milling results in high shear in the slurry, which provides for very successful co-dispersion, or blending of powders. Attrition milling typically achieves finer particles and better homogeneity of materials in the sintered compact than other methods such as conventional ball mills, tumbling ball mills, planetary ball mills, agitated or stirred ball mills. This is particularly so when attrition milling is used in a "two step" procedure whereby the secondary phase and the binder phase when used are milled using attrition milling to produce a fine mixture, which typically consists of nano-sized particles, generally having a particle size of between about 200 to about 500 nm particles. The resultant fine mixture and the CBN particles are further subjected to attrition milling to produce a homogenous mixture.

The advantages of using the "two step" attrition milling process is that typically a very fine starting material for sintering is obtained. The finer secondary hard phase and binder phase grains preferably have high specific surface area and therefore reactivity, leading to very good sintering between the CBN and secondary hard phase particles. Likewise, the small size of the secondary hard phase particles gives them high specific surface area, and hence good binding between secondary hard phase particles as well. In addition, the small size of the secondary hard phase particles results in a more homogenous compact which, when the compact is used in the formation of a tool insert, typically results in better performance of the tool insert.

The mixture of CBN and powdered matrix phase is subjected to elevated conditions of temperature and pressure at which CBN is crystallographically stable to produce a CBN compact. Such conditions and methods are well known in the art.

However, it will be appreciated that other effective methods may be utilized to produce a CBN compact according to the present invention and that the method of producing such a compact is not limited to that mentioned above.

The CBN content of the compact was determined in the following manner: A sample piece was cut using wire EDM and then polished. The polished surface of the CBN compact was analysed using a Scanning Electron Microscope. Backscatter electron images at a suitable magnifications, 3000, 5000 and 7000 times magnifications were selected depending on the estimated average grain size of CBN. (If the average grain size is less than one micron, 7000 times magnification was used; if the average CBN grain size is greater than 1 micron and less than 2 microns, 5000 times magnification is used. If the average grain size greater than 2 micron and less than 3 micron, 3000 times magnification was used.) At least 30 images were used in order to statistically represent the sample.

The collected grey scale images were analysed in steps. First, the grey scale image was electronically processed to identify CBN grains in the image. This processing involved using a threshold grey scale value for CBN to convert grey scale image into a binary image, where CBN grains were identified as one phase. The remaining phase is the matrix phase (non-CBN phase). Then, the total area of all of the identified CBN grains was measured and the percentage area of total CBN is calculated for each image. The average value of CBN area is then calculated by taking the average of all the measurements from typically more than 30 images. The CBN area percentage is taken to correspond with the overall CBN content of the material.

The matrix phase may further comprise tungsten carbide and/or $Al_2O_3$. These materials typically function as grain growth inhibitors that prevent/reduce grain growth of the secondary hard phase particles during high pressure and high temperature sintering.

CBN compacts of the present invention have particular application as tool inserts for the machining of hardened steel, hot and cold working tool steel, die steel, case hardened steel, high speed steel and ductile grey cast iron However, it will be appreciated that the applications of the CBN compacts of the present invention are not limited to those listed above.

EXAMPLES

The invention will now be illustrated by the following non-limiting examples:

Example 1

A sub-stoichiometric titanium carbonitride powder $Ti(C_{0.7}N_{0.3})_{0.8}$ of average particle size of 1.4 micron was mixed with Al powder, average particle size of 5 micron. The mass ratio between $Ti(C_{0.7}N_{0.3})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. A CBN powder mixture, containing about 30 wt % CBN with an average particle size of 0.7 micron and the remaining CBN with an average particle size of 2 micron, was added into the slurry at a certain amount to obtain an overall 65 volume percent CBN. The CBN-containing slurry was milled and mixed for an hour using attrition milling. The slurry was dried under vacuum and formed into a green compact and was sintered at 55 kbar (5.5 GPa) and about 1300° C. to produce a CBN compact.

According to X-ray diffraction analysis, the sintered material contained besides CBN and titanium carbonitride, small amounts of $TiB_2$, AlN, $Al_2O_3$ and WC. The XRD $TiB_2$ peak height from the (101) plane expressed as a percentage of the CBN peak height from the (111) plane, was 3.68%. The FWHM value of the titanium carbonitride peaks of the (111) and (200) planes were 0.315 and 0.331 degrees of $2\theta$, respectively.

The CBN content measured by image analysis was 53.4 percent by area as an average of analysis of 40 backscatter electron SEM images taken at a 5000 magnification. The percent by area is substantially the same as the volume percent.

Example 2

A sub-stoichiometric titanium carbonitride powder $Ti(C_{0.7}N_{0.3})_{0.8}$ of an average particle size of 1.4 micron was mixed with Al powder, average particle size of 5 micron. The mass ratio between $Ti(C_{0.7}N_{0.3})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. A CBN powder mixture, containing about 30 wt % CBN with an average particle size of 0.7 micron and the remaining CBN with an average particle size of 2 micron, was added into the slurry at a certain amount to obtain overall 45 volume percent CBN. The CBN-containing slurry was milled and mixed for an hour using attrition milling. The slurry was dried under vacuum and formed into a green compact and was sintered at 55 kbar (5.5 GPa) and about 1300° C. to produce a CBN compact.

According to X-ray diffraction analysis, the sintered material contained besides CBN and titanium carbonitride, small amounts of $TiB_2$, AlN, $Al_2O_3$ and WC. The XRD $TiB_2$ peak height from the (101) plane expressed as a percentage of the CBN peak height from the (111) plane, was 4.19%. The FWHM (full width half maximum) value of the titanium carbonitride peaks for the (111) and (200) planes were 0.522 and 0.582 degrees of $2\theta$, respectively.

The CBN content measured by image analysis was 38.5 percent by area as an average analysis value from 50 backscatter electron SEM images taken at a 5000 magnification. The percent by area is substantially the same as the volume percent.

Example 3

A sub-stoichiometric titanium carbonitride powder $Ti(C_{0.5}N_{0.6})_{0.8}$ of average particle size of 1.4 micron was mixed with Al powder, average particle size of 5 micron, using tubular mixer. The mass ratio between $Ti(C_{0.5}N_{0.5})_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. A CBN powder mixture, containing about 30 wt % CBN with average particle size of 0.7 micron and remaining CBN with average particle size of 1.4 micron, was added into the slurry at a certain amount to obtain overall 55 volume percent CBN. The CBN containing slurry was milled and mixed for an hour using attrition milling. The slurry was dried under vacuum and formed into a green compact and was sintered at 55 kbar (5.5 GPa) and about 1300° C. to produce a CBN compact.

According to X-ray diffraction analysis, the sintered material contained besides CBN and titanium carbonitride, small amounts of $TiB_2$, AlN, $Al_2O_3$ and WC. The XRD $TiB_2$ peak height from the (101) plane expressed as a percentage of the CBN peak height from the (111) plane, was 2.52%. The FWHM (full width half maximum) value of the titanium carbonitride peaks for the (111) plane were 0.593 degrees of $2\theta$.

The CBN content measured by image analysis was 48.1 percent by area based on the average from the analysis of 40 backscatter electron SEM images taken at a 5000 magnification. The percent by area is substantially the same as volume percent.

Example 4

A sub-stoichiometric titanium carbide powder $TiC_{0.8}$ of average particle size of 1.4 micron was mixed with Al powder, average particle size of 5 micron. The mass ratio between $TiC_{0.8}$ and Al was 90:10. The powder mixture was pressed into a titanium cup to form a green compact and heated to 1025° C. under vacuum for 30 minutes and then crushed and pulverized. The powder mixture was then attrition milled for 4 hours. A CBN powder mixture, containing about 30 wt % CBN with an average particle size of 1.4 micron was added into the slurry at a certain amount to obtain an overall 50 volume percent CBN. The CBN-containing slurry was milled and mixed for an hour using attrition milling. The slurry was dried under vacuum and formed into a green compact and was sintered at 55 kbar (5.5 GPa) and about 1300° C. to produce a CBN compact.

According to X-ray diffraction analysis, the sintered material contained besides CBN and titanium carbide, small amounts of $TiB_2$, AlN, $Al_2O_3$ and WC. The XRD $TiB_2$ peak height from the (101) plane expressed as a percentage of the CBN peak height from the (111) plane, was 4.88%. The FWHM value of the titanium carbonitride peaks of the (111) and (200) planes were 0.392 and 0.389 degrees of $2\theta$, respectively.

The CBN content measured by image analysis was 43.98 percent by area as an average of analysis of 45 backscatter electron SEM images taken at a 5000 magnification. The percent by area is substantially the same as the volume percent.

The invention claimed is:

1. A CBN compact comprising CBN particles and a matrix phase incorporating a secondary hard phase selected from TiCN, TiC, TiN, mixtures and solids solutions thereof and a maximum amount of titanium diboride defined as the XRD peak height of the titanium diboride (101) peak, after background correction, being less than 5% of the peak height of the (111) CBN peak, where the CBN compact contains 35 to 75 volume % of CBN.

2. A CBN compact according to claim 1, wherein a XRD peak for the secondary hard phase has a full width half maximum value of at least 0.2 degrees 2 theta.

3. A CBN compact according to claim 2, wherein the secondary hard phase is TiCN.

4. A CBN compact according to claim 2, wherein the matrix phase further comprises a binder phase that is aluminium or an aluminium-based compound.

5. A CBN compact according to claim 2, wherein the matrix phase further comprises tungsten carbide and/or $Al_2O_3$.

6. A CBN compact according to claim 1, wherein a XRD peak for the secondary hard phase has a full width half maximum value of at least 0.25 degrees 2 theta.

7. A CBN compact according to claim 6, wherein the secondary hard phase is TiCN.

8. A CBN compact according to claim 6, wherein the matrix phase further comprises a binder phase that is aluminium or an aluminium-based compound.

9. A CBN compact according to claim 6, wherein the matrix phase further comprises tungsten carbide and/or $Al_2O_3$.

10. A CBN compact according to claim 1, wherein a XRD peak for the secondary hard phase has a full width half maximum value of at least 0.3 degrees 2 theta.

11. A CBN compact according to claim 10, wherein the secondary hard phase is TiCN.

12. A CBN compact according to claim 10, wherein the matrix phase further comprises a binder phase that is aluminium or an aluminium-based compound.

13. A CBN compact according to claim 10, wherein the matrix phase further comprises tungsten carbide and/or $Al_2O_3$.

14. A CBN compact according to claim 1, wherein the secondary hard phase is TiCN.

15. A CBN compact according to claim 1, wherein the matrix phase further comprises a binder phase that is aluminium or an aluminium-based compound.

16. A CBN compact according to claim 1, wherein the matrix phase further comprises tungsten carbide and/or $Al_2O_3$.

17. A CBN compact according to claim 1, which contains 35 to 65 volume % of CBN.

18. A tool insert, comprising a CBN compact according to claim 1.

* * * * *